United States Patent
Grayson et al.

(10) Patent No.: US 6,477,355 B1
(45) Date of Patent: Nov. 5, 2002

(54) TRANSMISSION QUALITY REPORTING

(75) Inventors: Mark Grayson; Dennis Roy Mullins, both of London (GB)

(73) Assignee: ICO Services LTD, London (GB)

( * ) Notice: Subject to any disclaimer, the term of this patent is extended or adjusted under 35 U.S.C. 154(b) by 0 days.

(21) Appl. No.: 09/275,891

(22) Filed: Mar. 25, 1999

(30) Foreign Application Priority Data

Apr. 30, 1998 (EP) ............................................. 98303412

(51) Int. Cl.$^7$ ............................................... H04B 17/00
(52) U.S. Cl. ........................ 455/13.4; 455/67.1; 455/69; 455/423; 455/522
(58) Field of Search .................... 455/69, 502, 67.1, 455/423, 425, 13.4, 12.1

(56) References Cited

U.S. PATENT DOCUMENTS

| | | | |
|---|---|---|---|
| 4,261,054 A | * 4/1981 | Scharla-Nielsen | ........... 455/12 |
| 5,394,561 A | 2/1995 | Freeburg | |
| 5,446,756 A | 8/1995 | Mallinckrodt | |
| 5,621,737 A | 4/1997 | Bucher | |
| 5,778,030 A | * 7/1998 | Bruckert et al. | ............. 375/317 |
| 5,862,453 A | * 1/1999 | Love et al. | .................... 455/69 |
| 6,137,840 A | * 10/2000 | Tiedemanm et al. | ........ 375/297 |

FOREIGN PATENT DOCUMENTS

| | | |
|---|---|---|
| EP | 0 365 885 | 5/1990 |
| EP | 0 510 789 | 10/1992 |
| EP | 0 741 467 | 11/1996 |
| EP | 0 797 318 | 9/1997 |
| EP | 0 869 628 | 10/1997 |
| GB | 2 288 913 | 11/1995 |
| GB | 2 293 725 | 4/1996 |
| GB | 2 295 296 | 5/1996 |

OTHER PUBLICATIONS

"The GSM System for Mobile Communications", M. Mouly et al., pp. 477–492.

"Satellite Patterns for Continuous Multiple Whole–Earth Coverage", J.G. Walker, International Conference on Maritime and Aeronautical Satellite Communication and Navigation, Mar. 7–9, 1978, Royal Aircraft Establishment, pp. 119–122.

* cited by examiner

*Primary Examiner*—Thanh Cong Le
*Assistant Examiner*—Lana Le
(74) *Attorney, Agent, or Firm*—McDermott, Will & Emery

(57) ABSTRACT

In a satellite mobile telecommunication system, TDMF traffic is transmitted from a SAN 1 via a satellite 3 to a mobile user terminal UT1, over a duplex link 1, 2. The SAN 1 instructs the satellite 3a to transmit signals over link 1 to UT 1 at a power level dependent upon the quality of signal received by UT 1, so as to adaptively control the power to an efficient level. Similarly, the power level of signals transmitted by UT 1 to the satellite is controlled depending on the error rate. The power level required is computed as a function of the average of easured areas determined during a given measurement period together with a margin which is computed as an adaptive function of a deviation of the errors bout the average value.

16 Claims, 6 Drawing Sheets quality reporting process at UT 1 (step S3)

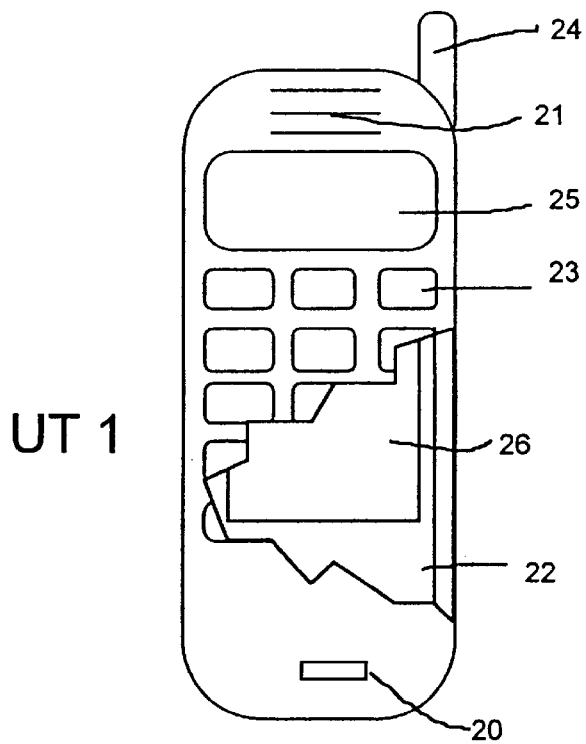
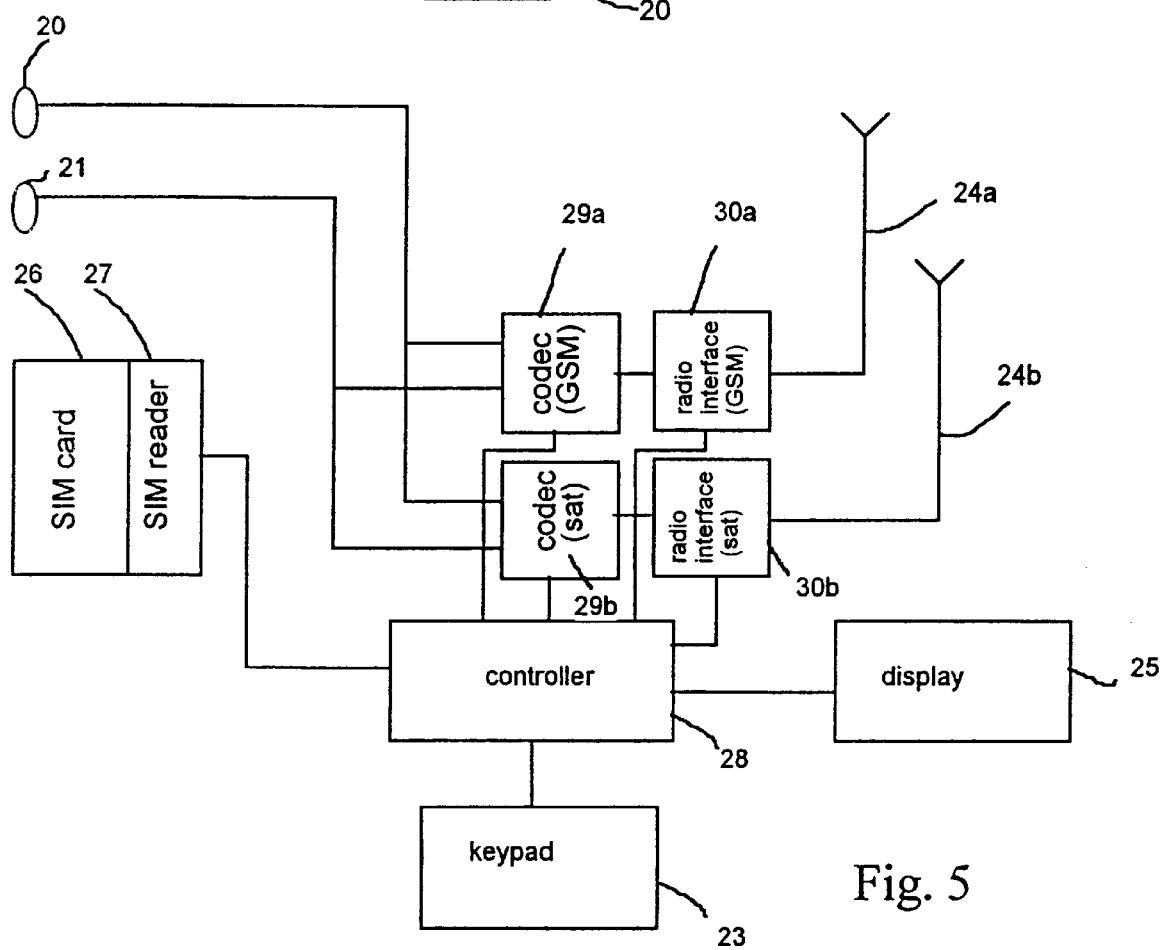
Fig. 4
Fig. 5 quality reporting process at UT 1 (step S3)

power setting process at SAN 1 (step S5)

power control at satellite 3a (step S8)

TRANSMISSION QUALITY REPORTING

FIELD OF THE INVENTION

This invention relates to improvements in and relating to reporting transmission quality for use in radio resource management of a radio telecommunications system, for example a satellite mobile telecommunications system, and has particular application to a base station subsystem and also a user terminal for the telecommunications system.

BACKGROUND

Terrestrial mobile telecommunications systems are well known and a number of different systems have developed which operate according to different standards. These public land mobile networks (PLMNs) may operate according to analog or digital standards. In Europe, the Far East, excluding Japan and elsewhere, the Global System Mobile (GSM) network has become popular, whereas in USA, the Advanced Mobile Phone Service (AMPS) and the Digital American Mobile Phone System (DAMPS) are in use, and in Japan, the Personal Handiphone System (PHS) and the Personal Digital Communication (PDC) network are used. More recently, proposals have been made for a Universal Mobile Telecommunications System (UMTS). These networks are all cellular and land based with transmitter/receivers which communicate with mobile user terminals.

Considering for example the GSM system, individual cells of the mobile network are served by a series of geographically spaced, terrestrial base station subsystems (BSS) which each comprise a base transceiver stations (BTS) which are coupled through base station controllers (BSCs) to a mobile switching centre (MSC) which may provide a gateway out of the network to a conventional public switched telephone network (PSTN). The PLMN includes a home location register (HLR) which stores information about the subscribers to the system and their user terminals (UTs). When a UT is switched on, it registers with the HLR. If the user roams to a different GSM network, the user terminal registers with a visitor location register (VLR) of the visited network, which communicates with the HLR of the home network for routing and other purposes. DAMPS, PHS and PDC networks have a generally similar architecture.

The telephone call is routed to the subscriber's UT through the MSC, to the BSC and then to the selected BTS, which provides a full duplex channel to the UT. The channel comprises a downlink channel from the BTS to the UT and an uplink channel from the UT to the BTS. The channels include time division multiple access (TDMA) time slots on frequencies allocated on initiation of the call.

In a GSM system, the telephone call is directed over a dedicated traffic channel or TCH. Each TCH has an associated slow rate control channel or SACCH, which is interleaved with the TCH. These channels are described in more detail on pp 195–201 of "The GSM System for Mobile Communications" by M. Mouly and M-B. Pautet, 1992 Cell & Sys, ISBN: 2-9507190-0-7.

The SACCH communicates control information between the UT and the BSS. In particular, the SACCH is used for power control, so as to control the power of signals transmitted by the BTS to the UT, and to control the power of signals transmitted from the UT to the BTS, in order to conserve battery power in the UT.

On commencement of a call, initial UT power level settings are transmitted in the uplink SACCH to the BTS and the UT. The UT then periodically measures the quality of the received signals on the downlink, for example every 0.5 sec. and the measured values are transmitted back on the SACCH uplink to the BTS and then to the BSC. The BSC includes processing circuitry to update the power settings and appropriate instructions are then communicated from the BSC to the BTS and the UT using the downlink SACCH.

The quality measurements carried out at the UT consist of successive measurements of the bit error rate (BER) in signals received from the BTS through the downlink, the measurement values being an average of the BER over a measurement period e.g. 0.5 sec.

The BSC uses these measurement values and its own measurements of received UT uplink emissions to calculate a desired power transmission level for the BTS and the UT, the desired power level being computed as a function of the average BER. A margin m is added to accommodate fading and shadowing of the transmitted signal. The margin has a fixed value e.g. 2db.

A number of different mobile telecommunication systems have been proposed that use satellite communication links to the mobile user terminals. One network known as the IRIDIUM™ satellite cellular system is described in for example EP-A-0365885 and U.S. Pat. No. 5,394,561 (Motorola), which makes use of a constellation of so-called low earth orbit (LEO) satellites, that have an orbital radius of 780 km. Mobile user terminals such as telephone handsets are configured to establish a link to an overhead orbiting satellite, from which a call can be directed to another satellite in the constellation and then typically to a ground station which is connected to conventional land-based networks.

Alternative schemes which make use of so-called medium earth orbit (MEO) satellite constellations have been proposed with an orbital radius in the range of 10–20,000 km and reference is directed to Walker J. G. "Satellite Patterns for Continuous Multiple Whole Earth Coverage" Royal Aircraft Establishment, pp 119–122 (1977). These orbits are also known as intermediate earth orbits (IEOs). As examples, reference is directed to the ICO™ satellite cellular system described for example in GB-A-2 295 296, and to the ODYSSEY™ satellite cellular system described in EP-A-0 510 789. With both the ICO™ and the ODYSSEY™ systems, the satellite communication link does not permit communication between adjacent satellites and instead, a signal from a mobile user terminal such as a mobile handset is directed firstly to the satellite and then directed to a ground station or satellite access node (SAN), connected to conventional land-based telephone network. This has the advantage that many components of the system are compatible with known digital terrestrial cellular technology such as GSM.

In satellite communications networks, ground stations are located at different sites around the world in order to communicate with the orbiting satellites. In the ICO™ system and others, a visitor location register is associated with each of the satellite ground stations, which maintains a record of the individual user terminals that are making use of the particular ground station.

In a satellite telecommunication system, it would be advantageous to control the power level of the individual UTs and the power of the satellite transmission which conveys signals from the satellite to the UT. This would conserve battery power for the UT and also would conserve power in the satellite, which has a limited power supply from its solar panels and batteries. It has therefore been proposed to include a power control arrangement, which makes use of measured values of a quality metric for signals received at the UT so that the satellite and UT can be commanded to operate at an optimum power level.

SUMMARY OF THE INVENTION

The present invention involves measurement of a quality metric for radio signals received by a user terminal during a given measurement period. An average of the values of the quality metric is produced together with a deviation signal which is a function of deviation between the average and at least one value for the measurement period. This data is transmitted to a remote subsystem which produces a set value of a transmission characteristic for the radio signals transmitted to the user terminal as a function of the average of the quality metric and a margin which is selected as a function of the deviation signal.

Thus, the margin is set adaptively as a function of the deviation rather than being a fixed value as in the prior art. In this way, the margin can be reduced when the deviation is small thereby conserving power.

More particularly, the invention includes a user terminal for a radio telecommunications system, comprising: measuring circuitry operable to provide respective measured values of a quality metric of wanted radio signals received by the terminal during a given measurement period, an averager to produce an average of the values of the quality metric, a processor to provide a deviation signal with a value as a function of a deviation between the average of the values of the quality metric and at least one of said measured values which adopts a predetermined value relationship with the average, in respect of the measurement period, and a transmitter to report the average value and the value of the deviation signal to a location remote from the user terminal.

The deviation may be between the average value and the measured value which deviates the most from the average value during the measurement period.

The user terminal may include setting circuitry responsive to a setting signal received from the remote location for setting a transmission characteristic of signals transmitted thereby in accordance with the setting signal.

The invention furthermore extends to a subsystem for use in a radio telecommunications system to communicate with remote user terminals, comprising: a receiver to receive from a remote user terminal data corresponding to an average of measured values of a quality metric for wanted radio signals received by the terminal during a given measurement period, and a deviation signal corresponding to a deviation between the average of the values of the quality metric and at least one of the measured values for the measurement period, and a processor operable to produce a set value of a transmission characteristic for radio signals transmitted to the user terminal as a function of both the average of the quality metric and a margin selected as a function of said deviation.

The invention has particular application to a satellite telecommunication system, in which case the set value of the transmission characteristic can be used to control the transmitted power of signals from the satellite to the user terminal. The set value can also be used to control the power level of the user terminal.

It will be appreciated that the invention can also be used with a PLMN to control the power of signals transmitted from a terrestrial base station to the user terminal and vice versa.

BRIEF DESCRIPTION OF THE DRAWINGS

In order that the invention may be more fully understood an embodiment thereof will now be described by way of example with reference to the accompanying drawings, in which:

FIG. 3 is a schematic block diagram of the circuits of satellite 3a;

FIG. 4 is a schematic diagram of a mobile user terminal;

FIG. 5 is a schematic block diagram of the circuits of the user terminal shown in FIG. 4;

FIG. 9 is a schematic flow diagram concerning the adjustment of power level at the satellite 3a.

DETAILED DESCRIPTION

Overview of Network

Figure 1:
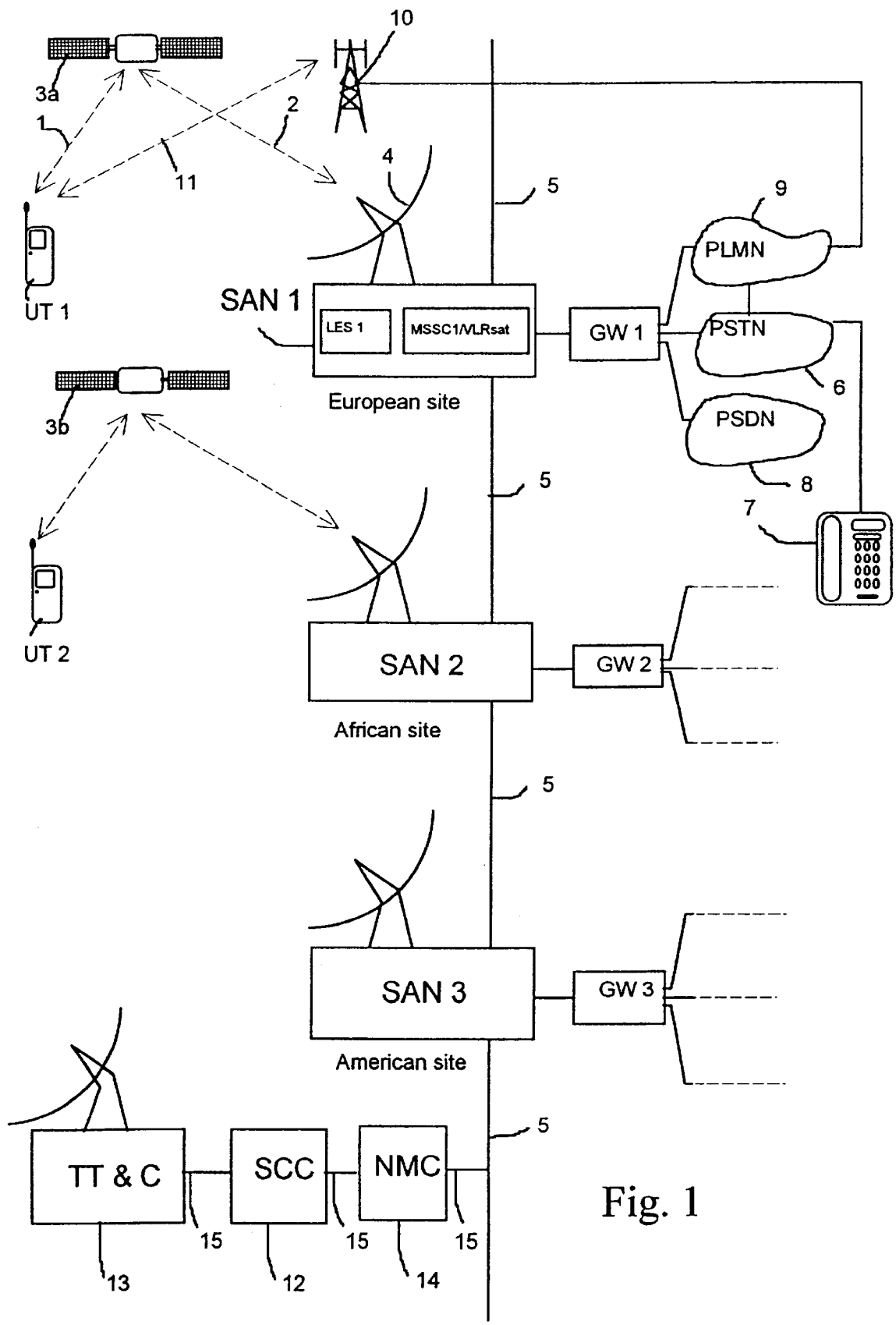
FIG. 1 is a schematic diagram of a satellite telecommunications system together with a local, land-based mobile telecommunications system, in accordance with the invention.

Referring to FIG. 1, a schematic block diagram of a satellite mobile telecommunication network is shown corresponding to the ICO™ network. A mobile user terminal UT 1 in the form of a mobile telephone handset can communicate on a radio channel over a communication path 1, 2 via an earth orbiting satellite 3a with a land-based satellite access node SAN1. As shown schematically in FIG. 1, SAN 1 is provided with an antenna 4 which can track the orbiting satellite.

A number of the satellite access nodes SAN 1, 2, 3, etc are connected together to form a backbone network 5, which is connected through a number of gateways GW 1, 2, 3, etc to conventional land-based telephone networks. For example, the gateway GW1, is connected to a land-based public switch telephone network (PSTN) 6, which permits connection to be made to a conventional telephone set 7. The gateway GW1 is additionally connected to a public switch data network (PSDN) 8 and a public local mobile network (PLMN) 9. Each of the gateways GW1, 2, 3 may comprise existing International Switching Centres (ISCs) or mobile switching centres (MSCs) of the type used in GSM mobile networks.

As shown in FIG. 1, the handset UT 1 can also communicate with the conventional land-based mobile network PLMN 9, which is shown schematically to include a transceiver station 10 that establishes a duplex link 11 with the user terminal UT 1. In this example, the PLMN 9 is a GSM network.

For a fuller understanding of GSM, reference is directed to the various GSM Recommendations issued by the European Telecommunications Institute (ETSI). Also reference is directed to "The GSM System for Mobile Communications" supra, for a more readable overview.

The satellite network is designed to provide worldwide coverage and the satellites 3a, 3b form part of a constellation of satellites, which may be arranged in several orbits. In one example, two orbits of five satellites are used, which can be shown to provide coverage of a major part of the surface of the earth, in which for a 10° satellite elevation angle, one satellite can be accessed by the mobile handset all of the time and two satellites can be accessed for at least 80% of the time, thereby providing system redundancy. Additional satellites may be included in the constellation in order to provide further redundancy.

The satellites may be arranged in a MEO constellation, for example with an orbital radius of 10,355 km, although the invention is not restricted to a particular orbital radius. In this embodiment, satellites 3a, 3b are shown in a common orbit and the satellites are tracked by the antenna arrangement of each SAN. The SANs are spaced around the earth in order to provide continuous coverage. In the example shown, SAN 1 may be located in Europe whereas SAN 2 may be located in Africa, SAN 3 in America and other SANs may be located elsewhere.

SAN 1 consists of a land earth station LES 1 which is coupled to the five dish antennas 4 for tracking the satellites, the LES 1 including transmitter and receiver circuits with amplifiers, multiplexers, demultiplexer and codecs. A mobile satellite switching centre MSSC 1 is coupled to LES 1 and includes a satellite visitor location register $VLR_{SAT}$ 1. MSSC 1 couples communication signals to the backbone network 5 and to the LES 1, so as to allow individual telephone calls to be established through the backbone network 5 and the duplex communication link 1, 2 via the satellite 3a, to the mobile terminal UT 1. Also, MSSC 1 is connected to the gateway GW1 so as to provide an output connection to PLMN 9, together with PSDN 8 and PSTN 6. It will be understood that all the SANs are of similar construction with a respective $VLR_{SAT}$ to maintain a record of the subscribers registered.

The $VLR_{SAT}$ 1 maintains a record of each of the subscribers currently registered, namely the identity of each user that is making use of the SAN 1 for signal communication.

In FIG. 1, the SAN 2 is shown communicating with user terminal UT 2 via satellite 3b. For further details of the network, reference is directed to GB-A-2 95 296 and EP-A-0 869 628.

The satellites 3a, 3b are in non-geostationary orbits and comprise generally conventional hardware such as the Hughes HS 601. They may include features disclosed in GB-A-2 288 913. Each satellite 3a, 3b is arranged to generate an array of radio beams covering a footprint on the earth beneath the satellite, each beam including a number of different frequency channels and time slots as described in GB-A-2 293 725. The beams thus provide adjacent cellular areas which correspond to the cells of a conventional land-based mobile telephone network. The satellites are controlled by means of a satellite control centre (SCC) 12 and a telemetry tracking and control station (TT&C) 13, which are connected to a network management centre (NMC) 14 through a digital network 15 that is coupled to the backbone network 5. The SCC 12 and the TT&C 13 control operations of the satellites 3a, 3b, e.g. for setting the general transmission power levels and transponder input tuning, as directed by the NMC 14. Telemetry signals for the satellites 3a, 3b are received by the TT&C 13 and processed by the SCC 12 to ensure that the satellites are functioning correctly.

Channel Configuration

During a telephone call, each of the handsets communicates with a respective SAN via one of the satellites. Thus for example, handset UT 1 communicates with SAN 1 via satellite 3a. A full duplex communication path is provided between the UT and the SAN. As referred to herein, communication from the SAN to the UT via the satellite is referred to as a "downlink", and communication directed from the UT via the satellite to the SAN is referred to as an "uplink".

Figure 2:
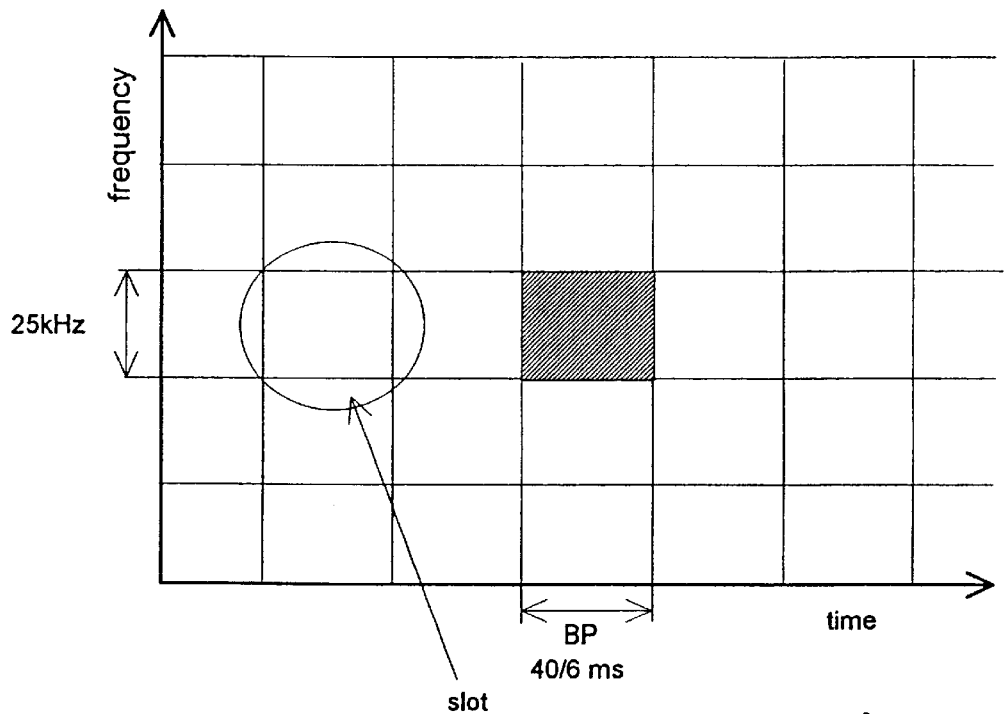
FIG. 2 is a schematic frequency/time diagram illustrating time slots for the FDMA transmission scheme.
Figure 3:
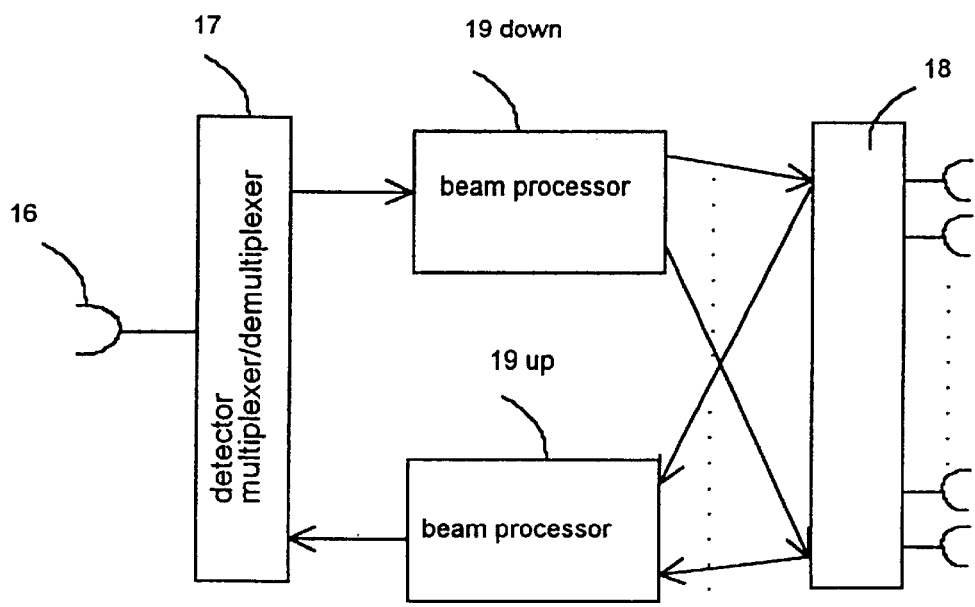

The general configuration of the transmitted signals is similar to those used for conventional GSM transmissions in a PLMN and makes use of a frequency diverse time division multiple access (TDMA) scheme. For speech transmission, data is sent on a traffic channel TCH. Each TCH is provided with an associated slow-rate control channel or SACCH. The configuration of these channels in the TDMA scheme will now be described in more detail. Referring to FIG. 3, the basic unit of transmission between the SAN and UT is a series of about 100modulated digital bits, which is referred to as a burst. Bursts each have a finite duration and occupy a finite part of the radio spectrum. Thus, they are sent in time and frequency windows which are referred to as slots. The slots are positioned every 25 kHz and recur in time every 40/6 ms. The duration of each slot is referred to as a burst period or BP. A graphical representation of a slot in the time and frequency domain is shown in FIG. 2.

Each TCH consists of one slot every 6 BP and comprises a cycle of 25 slots. 24 of the 25 slots are used to transmit TCH data, and one slot is vacant. The SACCH is multiplexed over 12 consecutive slots. Two SACCH blocks are transmitted for ever 25 slot cycle.

It will be appreciated that with the configuration, 6 TCHs can be interleaved due to the fact that each TCH consists of a slot every 6 BP. The resulting interleaved structure thus provides a frame of 6 TCHs every 6 BP.

Satellite

A schematic diagram of the major signal processing components of the satellite is given in FIG. 3. Signals transmitted from one of the SANs are received by antenna 16 and directed to a detector/multiplexer/demultiplexer circuit 17. It will be understood that the signal transmitted from the SAN to the satellite contains a large number of TCH/SACCHs that are to be directed to individual UTs by the satellite. To this end, the satellite includes a plurality (for example 163) of antennas 18 that produce individual spot beams that correspond to a cellular configuration as previously described. A beam forming processor circuitry configuration $19_{down}$ receives the various TCH/SACCHs that a demultiplexed by circuit 17 and assembles them into multiplexed signals directed on 163 outputs to the spot beam antennas 18. The circuitry $19_{down}$ includes gain control functionality to allow the gain of individual TCH/SACCH channels to be dynamically altered, as will be explained in more detail hereinafter.

For signals on the uplink from the individual UTs to the SAN, the various transmissions are received by the spot beam antennas 18 and directed to processing circuitry $19_{up}$ which combines the various channels and passes them to the multiplexer configuration in circuit 17 for transmission through the antenna 16 to the SAN.

It will be understood that the foregoing description of the satellite circuitry is schematic and for further details, reference is directed to GB-A-2 288 913 supra.

User terminal (UT 1)

The mobile user terminal UT 1 is shown in more detail in FIGS. 4 and 5. It comprises a hand held device which is generally similar to a mobile telephone used for conventional terrestrial GSM networks. It is powered by a rechargeable battery (not shown) and is configured to operate with both the local terrestrial cellular network and the satellite network. Thus, in the example shown in FIG. 1, the mobile handset UT 1 can operate either according to a land-based GSM protocol or according to the satellite network protocol. A shown in FIG. 4, the handset comprises a microphone 20, a loudspeaker 21, a battery 22, a keypad 23, antennas 24a, 24b and a display 25. The handheld unit UT 1 also includes a subscriber identification module (SIM) smartcard 26. The circuit configuration of the handset UT 1 is shown in block diagrammatic form in FIG. 5. The SIM card 26 is received in an SIM card reader 27 coupled to a controller 28, typically a microprocessor. The microphone and loudspeaker 20, 21 are coupled to first and second codecs 29a, 29b coupled to conventional radio interfaces 30a, 30b connected to the antennas 24a, 24b so as to transmit and receive communication signals, in a manner well known per se. The handset is capable of dual mode operation, with the codec 29a, radio interface 30a and antenna 24a being used with the GSM PLMN 9, and corresponding circuits 29b, 30b and 24b being used with the satellite network. Amongst other things, the controller 28 can control the gain of the radio interface 30b so as to change adaptively the power at which signals are transmitted by UT 1 to the satellite 3a when the satellite mode of operation is selected. As will be explained hereinafter, the power level is set depending on the quality of the received signals so as to keep the transmitted power level as low as practicable, in order to conserve battery power.

Service provision

The described network can provide service to customers in a number of different ways. For example, communication may be provided from UT 1 to UT 2 using the satellite backbone network 5. Alternatively, telephone communication can be established between the telephone set 7 and UT 1 either via SAN 1 and satellite 3a, or, through PLMN 9, antenna 10 and link 11. For further description of service options, reference is directed to our EP-A-0 869 628.

In the following, a telephone call established between telephone set 7 and UT1 through SAN 1 and satellite 3a will be considered in more detail.

Quality Reporting and Power Control

When voice channel communication is established between telephone set 7 and UT 1 via SAN 1 and satellite 3a, a TCH/SACCH$_{up}$ channel is opened for the uplink and a TCH/SACCH$_{down}$ is opened for the downlink, so as to provide bidirectional communication. During the call, the quality of the signals received at UT 1 is reported back to SAN 1 in SACCH$_{up}$ and in response, SAN 1 sends instructions in SACCHdown to both the satellite 3a and UT 1 to adjust their power levels in order to ensure that the satellite transmits TCH/SACCH$_{down}$ with sufficient signal strength to be received by UT 1 satisfactorily, and also to ensure that the signal strength from UT 1 to the satellite, is no greater than needed to achieve satisfactory communication. This quality reporting and power level setting will now be described in more detail.

Figure 6:
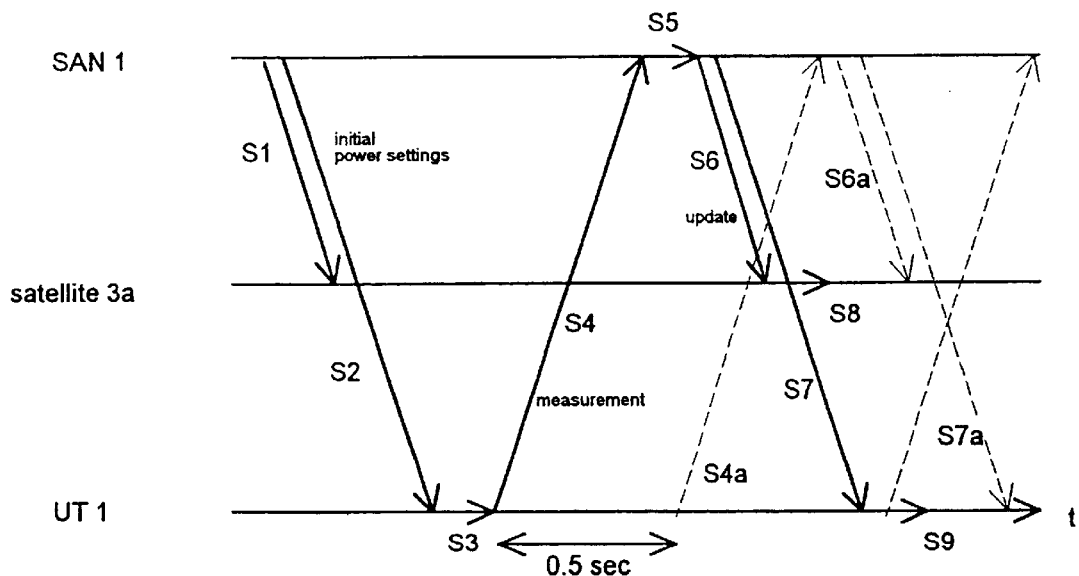
FIG. 6 is a schematic timing diagram of the steps involved in quality reporting and power control, in accordance with the invention.

FIG. 6 shows the communication flow of power measurement and control signals as a function of time t between SAN 1, satellite 3a and user terminal UT 1. When the call is initially established, at steps S1 and S2, SAN 1 sends the initial power level instructions to the satellite 3a and UT 1. Satellite 3a responds to the initial instruction in order to set the power level of TCH/SACCH$_{down}$ transmitted from the satellite to UT 1, as will be explained in more detail hereinafter. Furthermore, UT 1 responds to the power level encoded in SACCH$_{down}$ at step S2, so as to adjust its transmitted power level accordingly, for signals transmitted from UT 1 to satellite 3a.

At step S3, the UT 1 performs a measurement of the quality of the received signals from the satellite 3a. This will be described in more detail hereinafter and comprises a measurement of received signal quality.

At step S4, the measurement of the received signal quality is encoded in SACCH$_{up}$ and transmitted back to SAN 1 via satellite 3a.

At step S5, SAN 1 computes updated power settings for the satellite 3a and UT 1, which are encoded in SACCH$_{down}$ and transmitted to the satellite 3a and the user terminal UT 1 at steps S6 and S7 respectively.

At step S8, the satellite adaptively adjusts the power level for TCH/SACCH$_{down}$ transmitted to UT 1, to an appropriate minimum value in order to minimise power consumption by the satellite but ensure satisfactory reception by UT 1. Similarly, at step S9, UT 1 adjusts its transmitted power level in response to the instruction given in step S7, in order to preserve battery power.

The quality of the signals received by UT 1 is monitored periodically, for example every 0.5 sec and reported back to SAN 1, as shown schematically by step S4a. Thus, SAN 1 repeatedly responds to the sequential quality reports to adjust the power levels for the satellite 3a and UT 1 as shown schematically by steps S6a and S7a.

Quality Measurement—Step S3

Figure 7:
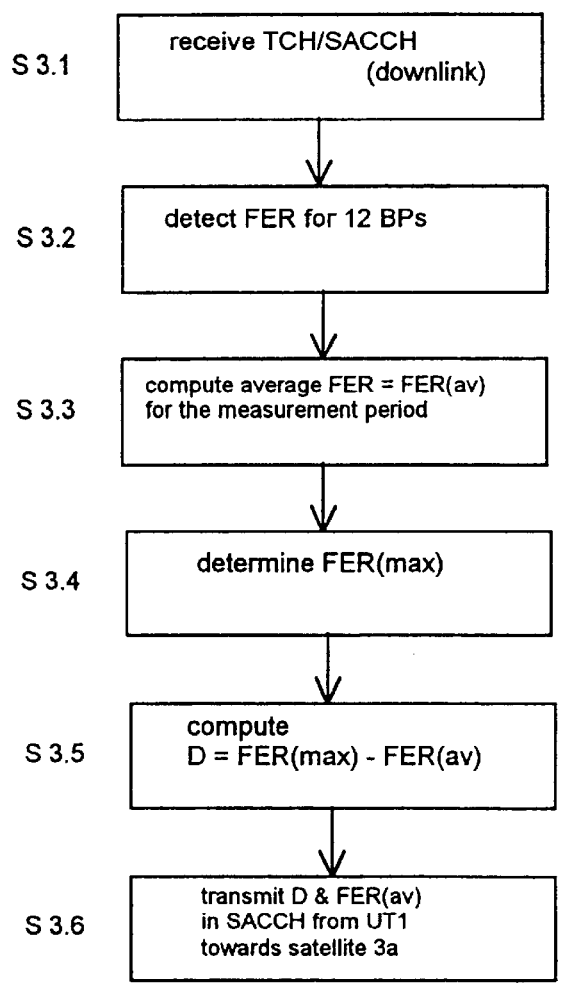
FIG. 7 is a block diagram of the quality measurement carried out at the user terminal.

The measurement of the quality of the received signals at UT 1 will now be described with reference to FIG. 7. This step is carried out by the controller 28 of UT 1 (FIG. 5). Referring to FIG. 7, at step S3.1, the TCH/SACCH$_{down}$ is detected and at step S3.2, a data error rate is detected in the TCH/SACCH. It will be understood that the TCH consists of a sequence of bursts, each occurring within an aforementioned burst period BP. The error rate may be detected over 12 consecutive bursts of the TCH/SACCH. Each burst contains approximately 100 symbols and 12 samples of the error rate are taken for the 12 burst periods respectively. Hereinafter, the number of errors per burst period will be referred to as a frame error rate (FER). Thus, 12 successive measurements of FER are taken during a measurement period corresponding to 12 successive slots of the TCH/SACCH$_{down}$.

At step S3.3, an average value of FER is computed for the 12 measurements made during the measurement period, in order to compute FER$_{av}$.

At step S3.4, the maximum sampled error FER$_{max}$ is determined.

At step S3.5 a deviation D corresponding to the difference between the average error FER$_{av}$ and the maximum value FER$_{max}$ is computed, namely $$D = FER_{max} - FER_{av} \tag{1}$$

At step S3.6 the value of the deviation D and FER$_{av}$ are encoded in the signals transmitted back by the UT 1 to SAN 1. Thus, SACCH$_{up}$ is encoded with the values of D and FER$_{av}$, and is transmitted to SAN 1 at step S4 (FIG. 6).

Setting the Power Level—Step S5

In this step, the SAN calculates appropriate power levels for the satellite 3a and user terminal UT 1. The computation is carried out in a suitable processor in the SAN, either in LES 1 or MSSC 1 (FIG. 1).

Figure 8:
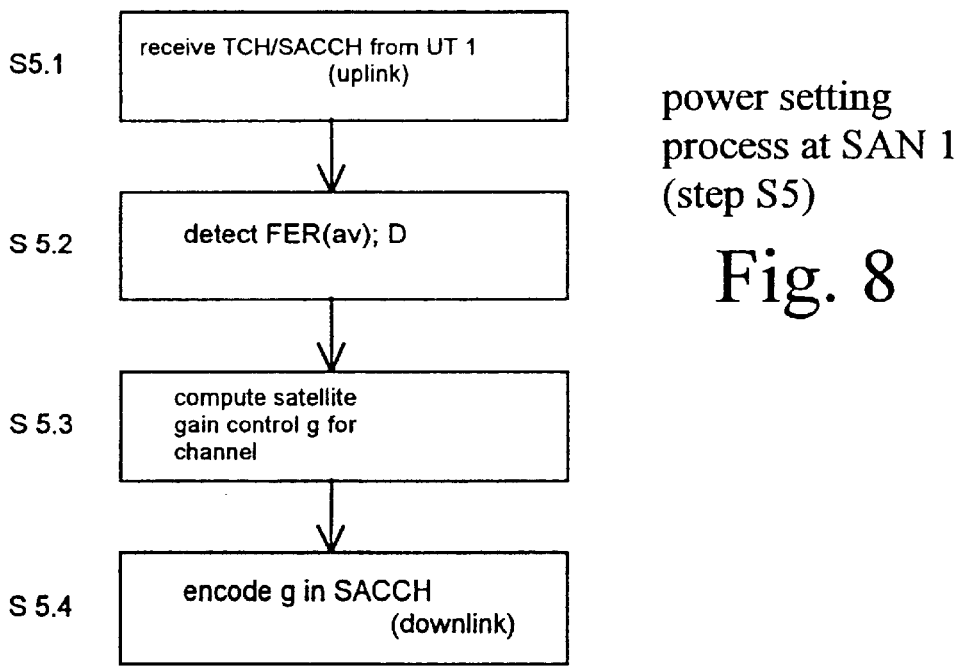
FIG. 8 is a schematic diagram of the steps carried out at SAN 1 to control the power level for satellite 3a and user terminal UT 1.

At step S5.1 shown in FIG. 8, the TCH/SACCH$_{up}$ is detected from the user terminal UT 1.

At step S5.2, the values of FER$_{av}$ and D are detected from SACCH$_{up}$, namely the values derived from an individual measurement period at UT1.

At step S5.3, a computation is carried out in order to determine a suitable instruction for controlling the power level of the channel TCH/SACCH$_{down}$, as transmitted by satellite 3a, together with a suitable power control signal for UT 1, to control the power level of TCH/SACCH$_{up}$, is carried out. In this example, it is seen that the power control for both the satellite 3 and UT 1 can be controlled by the same parameter namely a gain control parameter g. The gain control parameter g is calculated according to the following formula $$g = f(FER_{av}) + m \tag{2}$$

Thus, the required gain g is a function $f$ of the average error rate for the measurement period at UT 1. Accordingly, if the error rate increases, the gain is increased at the satellite and UT 1 in order to reduce the error rate.

Equation (2) also includes a power margin m which is intended to provide a margin for signal fading that the effect of shadowing produced by buildings and the like. In accordance with the invention, the margin m is not a fixed value but instead varies according to the deviation D between the average error rate $FER_{av}$ and the worst case sample $FER_{max}$ for the measurement period, i.e.

$$m = f(D). \qquad (3)$$

Thus, if the value of the deviation D is relatively small, the value of the margin m can be reduced safely. However, if there is a large spread between the worst case error and the average, a relatively large value of margin m should be used in order to accommodate the wide variations in received error.

It will be appreciated that adaptively varying the value of the margin m permits the value of gain g to be set more efficiently thereby conserving power at satellite 3a and conserving battery power for UT 1.

At step S5.4, the computed value of g is encoded in $SACCH_{down}$ and, as previously explained, it is transmitted at steps S6 and S7 to the satellite 3a and UT 1 (FIG. 6).

Power Control at Satellite—Step S8

Figure 9:
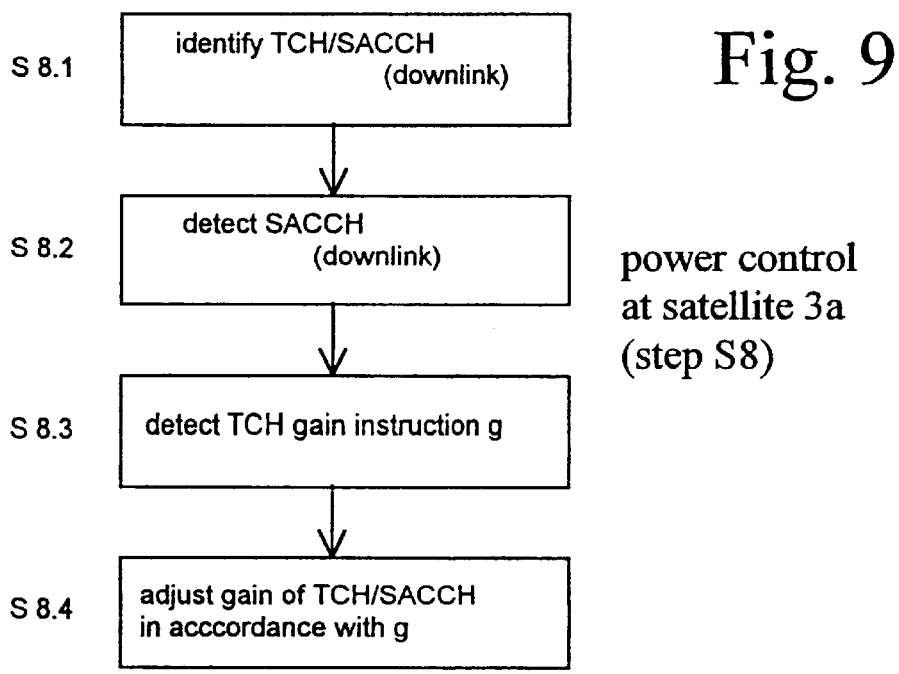

Referring to FIG. 9, the power at which the uplink channel $TCH/SACCH_{down}$ is transmitted from the satellite 3a to UT 1 is adaptively controlled by the processing circuitry 19 as shown in FIG. 3. At step S8. 1, the slots in the TDMA scheme corresponding to $TCH/SACCH_{down}$, for the channel concerned, is identified and at step S8.2, SACCH is detected. At step S8.3, the value of g is detected, namely the instruction to set the gain for the channel concerned.

At step S8.4, the gain of the channel $TCH/SACCH_{down}$ is adjusted into conformity with the value of gain g, so that the channel is included within a particular beam, as transmitted by the antenna array 18, with a channel power level set in accordance with the value of the parameter g.

Power Control at UT 1—Step S9

As previously explained in relation to FIG. 6, the value of the gain g is also transmitted to UT 1 at step S7, and the power of the transmitted signal $TCH/SACCH_{up}$ is controlled as a function of the gain signal g. As previously described with reference to FIG. 6, this power control is carried out in step S9.

Figure 10:
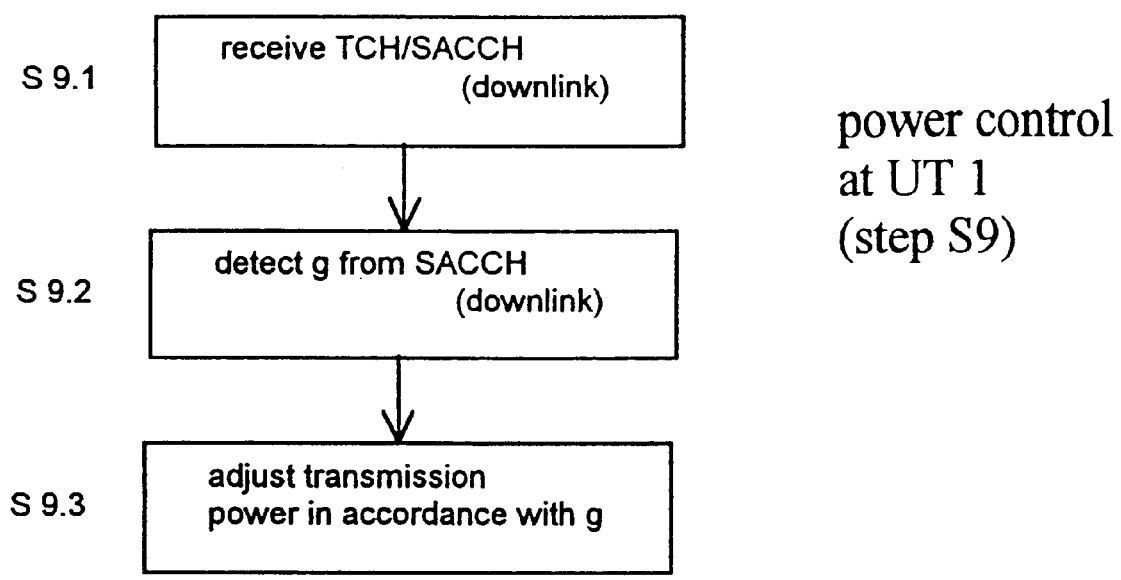
FIG. 10 illustrates adjustment of the power level at UT 1.

FIG. 10 illustrates in more detail how the power is controlled at UT 1. At step S9.1, the SACCH of the downlink detected by radio interface 30b (FIG. 5) is detected and the value of the gain parameter g is fed to the controller 28 (FIG. 5) at step S9.2. The power of the transmitted signals is then controlled by controller 28, which adjusts the gain of the radio interface 30b, as step S9.3 so that the gain and hence the power is controlled in accordance with the value of the parameter g.

Due to the fact that the margin m contained within the parameter g is adaptively varied depending on the deviation D, the control of the transmitted power of UT 1 and satellite 3a is controlled much more efficiently than hitherto, thereby improving efficiency of power allocation in the satellite 3a and improving the battery life for UT 1.

Various modifications and variations of the invention are possible for example, whilst the quality measuring and power control has been described in relation to a satellite telecommunication system, it will be appreciated that it could similarly be applied to a conventional PLMN. For example, considering when a telephone call is routed to UT 1 via the GSM PLMN 9, the power control can be carried out by BSC 1 (in the same manner as SAN 1) so as to instruct BTS 1 to operate at a power level determined by the gain parameter g and to instruct UT 1 when operating with its GSM codec 29a and radio interface 30a (FIG. 5) with a power level set by the gain parameter g. Thus, the quality reporting would be over duplex link 11 shown in FIG. 1.

Also, whilst the error detection at UT 1 is carried out on the basis of a frame error, other appropriate quality metrics could be measured and reported back to SAN 1 in order to control the gain, for example bit error rate (BER). Also, whilst the parameter D has been computed on the basis of the difference between the average and the worst value of FER, instead of using just the worst value, a representation of the worst value may be provided by for example taking an average of a small number of the worst values e.g. most worst, next worst etc.

Alternatively, the deviation may comprise the standard deviation or some other statistical measure of the spread of the values within the sample thereof taken during the measurement period, relative to the average value. The average itself may be a mean value, a weighted average or some other suitable collective statistical representation of the measurement values.

Although the described system is operative to control the power level of the transmitted signals, it can be used to control other, different transmission characteristics of the transmitted signals. For example, in a GSM system, it can be used to control timing advance. It could also be used to provide phase control in order to compensate for doppler shift, which needs to be considered for satellite systems.

The invention is not restricted to GSM type signal channels and can be used with IS-41 or other known mobile protocols. The invention also can be used with other satellite systems such as the ODYSSEY or IRIDIUM system discussed hereinbefore. Whilst the user terminals have been described as mobile, it will be understood that they may be semi-mobile, e.g. mounted on a ship or aircraft, and may actually be stationary during operation.

What is claimed is:

1. A user terminal for a radio telecommunications system, comprising:

measuring circuitry operable to provide respective measured values of a quality metric of wanted radio signals received by the terminal during a given measurement period, an averager to produce an average of the values of the quality metric, a processor to provide a deviation signal with a value as a function of a deviation between the average of the values of the quality metric and at least one of said measured values which adopts a predetermined value relationship with the average, in respect of the measurement period, and a transmitter to report the average value and the value of the deviation signal to a location remote from the user terminal.

2. A user terminal according to claim 1 wherein said one of the measured values comprises the measured value which deviates the most from the average value during the measurement period.

3. A user terminal according to claim 1 wherein the quality metric comprises a frame error rate in successive samples of the received radio signals.

4. A user terminal according to claim 1 wherein the quality metric comprises a bit error rate in successive samples of the received radio signals.

5. A user terminal according to claim 1 including setting circuitry responsive to a setting signal received from the remote location for setting a transmission characteristic of signals transmitted thereby in accordance with the setting signal.

6. A subsystem for use in a radio telecommunications system to communicate with remote user terminals, comprising:

a receiver to receive from a remote user terminal data corresponding to an average of measured values of a quality metric for wanted radio signals received by the terminal during a given measurement period, and a deviation signal corresponding to a deviation between the average of the values of the quality metric and at least one of the measured values for the measurement period, and a processor operable to produce a set value of a transmission characteristic for radio signals transmitted to the user terminal as a function of both the average of the quality metric and a margin selected as a function of said deviation.

7. A subsystem according to claim 6 including a processor to produce a signal corresponding to said set value of said transmission characteristic, and a transmitter operable to transmit said signal to a remote location to control transmission therefrom.

8. A subsystem according to claim 6, comprising a ground station for a satellite telecommunications system, wherein said signal is transmitted towards a satellite for controlling a transmission characteristic thereof.

9. A subsystem according to claim 6, comprising a base station subsystem for a terrestrial telecommunications system, wherein said signal is transmitted towards the remote user terminal for controlling a transmission characteristic thereof.

10. A subsystem according to claim 6 wherein the transmission characteristic comprises transmitted power level.

11. A method of operating a user terminal for a radio telecommunications system, comprising:

determining respective measured values of a quality metric of wanted radio signals received by the terminal during a given measurement period, computing an average of the values of the quality metric, determining a deviation between the average of the values of the quality metric and at least one of the measured values for the measurement period, and reporting the average value and the deviation to a location remote from the user terminal.

12. A method of operating a subsystem for use in a radio telecommunications system to communicate with remote user terminals, comprising:

receiving from a remote user terminal, data corresponding to an average of the values of a quality metric for radio signals received by the terminal during a given measurement period, and a deviation between the average and at least one of the measured values of the quality metric for the measurement period, and producing a set value of a transmission characteristic for radio signals transmitted to the user terminal as a function of both the average of the quality metric and a margin selected as a function of said deviation.

13. A method according to claim 12 including forming a setting signal corresponding to the set value and transmitting the setting signal towards the remote user terminal.

14. A method according to claim 13 including transmitting the setting signal towards an earth orbiting satellite to set the power level of signals transmitted thereby to the remote user terminal.

15. A method according to claim 13 including transmitting the setting signal towards an earth orbiting satellite to set the power level of signals transmitted thereto by the remote user terminal.

16. A method according to claim 14 including encoding the setting signal in a TCH/SACCH.

* * * * *